United States Patent
Jarmain

[19]

[11] Patent Number: 6,145,291
[45] Date of Patent: Nov. 14, 2000

[54] GRAPE HARVESTER WITH BEATERS ADJUSTABLE FOR DIFFERENT ROW WIDTHS

[76] Inventor: Paul Laurence Jarmain, 72 Labrina Avenue, S.A., Prospect 5082, Australia

[21] Appl. No.: 09/202,074

[22] PCT Filed: Jun. 6, 1997

[86] PCT No.: PCT/AU97/00361

§ 371 Date: Mar. 3, 1999

§ 102(e) Date: Mar. 3, 1999

[87] PCT Pub. No.: WO97/47176

PCT Pub. Date: Dec. 18, 1997

[30] Foreign Application Priority Data

Jun. 7, 1996 [AU] Australia ................................. PO0297

[51] Int. Cl.⁷ .................................................. A01D 46/00
[52] U.S. Cl. ............................................. 56/330; 56/328.1
[58] Field of Search .................... 56/230, 328.1, 56/332, 333, 340.1, DIG. 19

[56] References Cited

U.S. PATENT DOCUMENTS

| | | | |
|---|---|---|---|
| 4,063,406 | 12/1977 | Burton | 56/330 |
| 4,112,657 | 9/1978 | Bénac et al. | 56/330 |
| 4,207,727 | 6/1980 | Poytress | 56/330 |
| 4,250,700 | 2/1981 | Horn et al. | 56/330 |
| 4,418,521 | 12/1983 | Orlando et al. | 56/330 |
| 4,538,406 | 9/1985 | Littau | 56/330 |
| 4,974,404 | 12/1990 | Korthuis et al. | 56/330 |
| 4,974,405 | 12/1990 | Littau | 56/330 |
| 5,027,593 | 7/1991 | Korthuis et al. | 56/328.1 |
| 5,067,314 | 11/1991 | Burke | 56/330 |
| 5,339,612 | 8/1994 | Scott | 56/328.1 |
| 5,355,667 | 10/1994 | Scott | 56/328.1 |
| 5,423,166 | 6/1995 | Scott | 56/330 |
| 5,660,033 | 8/1997 | Korthuis et al. | 56/330 |
| 5,666,796 | 9/1997 | Korthuis | 56/330 |

FOREIGN PATENT DOCUMENTS

| | | |
|---|---|---|
| 513428 | 6/1978 | Australia . |
| 0 692 181 | 1/1996 | European Pat. Off. . |
| 2469096 | 5/1981 | France . |
| 263805 | 4/1990 | France . |

OTHER PUBLICATIONS

Derwent Abstract Accession No. A3398Y/02, Class P13, SU, A,491347 Viniculture Winemak) Jun. 11, 1976.
Derwent Abstract Accession No. 92–191058/23, Class P12, SU, A, 1662407 (Wine Growing Prod Res) Jul. 15, 1991.

*Primary Examiner*—Thomas B. Will
*Assistant Examiner*—Arpad Fabian Kovacs
*Attorney, Agent, or Firm*—Finnegan, Henderson, Farabow, Garrett & Dunner

[57] ABSTRACT

A harvester especially for grapes wherein sets of beaters (4, 5) on each side of the harvester are adapted to be used in unison to effect a beating action to remove fruit from plants being harvested, with devices (35, 36) to change a relative position of respective pivot supports (29) for each respective set of the beaters (4, 5) while the sets of beaters (4, 5) are in a beating mode and operating. A hydraulic ram arrangement (35, 36) that facilitates this by being able to be over the grape collection area without hydraulic connection fittings and flywheels that are supported on sub frames in a way that will not unduly prejudice the beating action. An arrangement for detecting changes in pressure of the beaters and arranging for a change in position of support of the beaters in response.

9 Claims, 4 Drawing Sheets

GRAPE HARVESTER WITH BEATERS ADJUSTABLE FOR DIFFERENT ROW WIDTHS

BACKGROUND OF THE INVENTION

This invention relates to harvesters and in particular to grape harvesters of a type using beaters.

Support means to synchronously drive sets of beaters for both sides of vines when harvesting grapes have these sets supported from, for each side, a sub frame which is supported from an uppermost pivot support aligned to rotate about a forward to rearward direction while having a substantially horizontally aligned axis.

Such an arrangement allows for a small amount of relative lateral adjustment with however resultant significant angular changes in direction of beating action.

These implicitly change as the vines at a location in the row are wider or narrower with resultant loss of beater grape removal effectiveness.

A first problem then is to facilitate the reduction in the possible angular variation in a way that will enable rapid changes to provide for improved efficiency.

The drive of the beater sets on each side of a vine is not so simple.

One problem is to ensure that the beater sets from each respective side act together in unison or in phase so as to move the vine from side to side at substantial speed to effect removal of the grapes.

A second problem results from the need to use flywheels to effect an averaging of drive force from an economic drive motor.

The problem here is that in order to reduce transmission forces over longer distances a flywheel needs to be as close as possible to the output for each set of beaters but in existing arrangements the position of the flywheels has caused problems that have further required constraints in support systems.

A further problem is to provide a mechanical arrangement which is efficient from the point of view of ease of control and secondly cost of implementation and in so far that this involves hydraulic rams, an understanding that hydraulic rams can be used in this application In a way Which would normally not be considered appropriate for collection of fruit for wine making.

The problem is to offer a solution to at least some of these problems or at least offer the public a useful alternative.

SUMMARY OF THE INVENTION

According to this invention there is proposed a grape harvester including a frame to straddle a vine and means to move the harvester along the vine while straddling the vine, a first set of beaters with beaters extending inwardly and rearwardly from a first side of the frame and a second set of beaters with beaters extending inwardly and rearwardly from an opposite side of the frame, means to effect synchronous to and fro action of both sets of beaters to effect thereby movement of the vine to effect removal of grapes therefrom, characterised in that the first set of beaters is supported from a first sub frame which is supported from an upper pivot on a first support and the second set of beaters is supported by a second sub frame which second sub frame is supported from an upper pivot on a second support, and there are means comprising hydraulic rams to move the said first and second supports closer together or further apart.

This then allows for very quick adjustment of the distance apart of the beaters and as such this implicitly changes the angle of the beaters so that this can be more easily adjusted to improve efficiency of removal of grapes.

One problem with use of hydraulic rams in this application is that by reason of the application the ram or rams need to be above a grape collection area. If the slightest leak of hydraulic fluid occurs from any joint or connection then this can have the result that all of the grapes collected for wine making can be contaminated with substantial economic loss.

Hydraulic pipes and joints have a high risk of leaking and as such suggest that the option of this answer is not a good risk option.

In preference there is provided a single shaft and two hydraulic cylinders each surrounding a selected length of the shaft so that the action of the hydraulic pressure is to change the position of the respective cylinder along the length of the shaft.

In preference the respective supports are supported by the respective cylinders.

In preference the connections to the cylinders for access of hydraulic fluid are by way of connections only at a respective outer end of the cylinder so that a location of any connection is not thereby above a grape collection area.

In preference the beater sets are driven through for each side a flywheel supported with the flywheel supported by the respective sub frame for rotation of the wheel about its central axis which is orientated to be transverse to a forward to rearward direction and approximately horizontal.

This has the result that precessional torces are constrained by the sub frame support system described and not substantially transferred to alter or effect motion of the beaters.

The feature that there are means to move the said first and second supports closer together or further apart means that in contradiction to what has previously been the case the distance apart can be changed while the harvester is operating. This allows the support positions to be changed very quickly and to allow these changes to be effected on the run. Because the hydraulic system with the preferred features can ensure a clean result the whole concept becomes viable.

BRIEF DESCRIPTION OF THE DRAWINGS

For a better understanding of this invention this will now be described with reference to a preferred embodiment which shall be described with the assistance of drawings wherein.

DETAILED DESCRIPTION OF THE INVENTION

Figure 3:
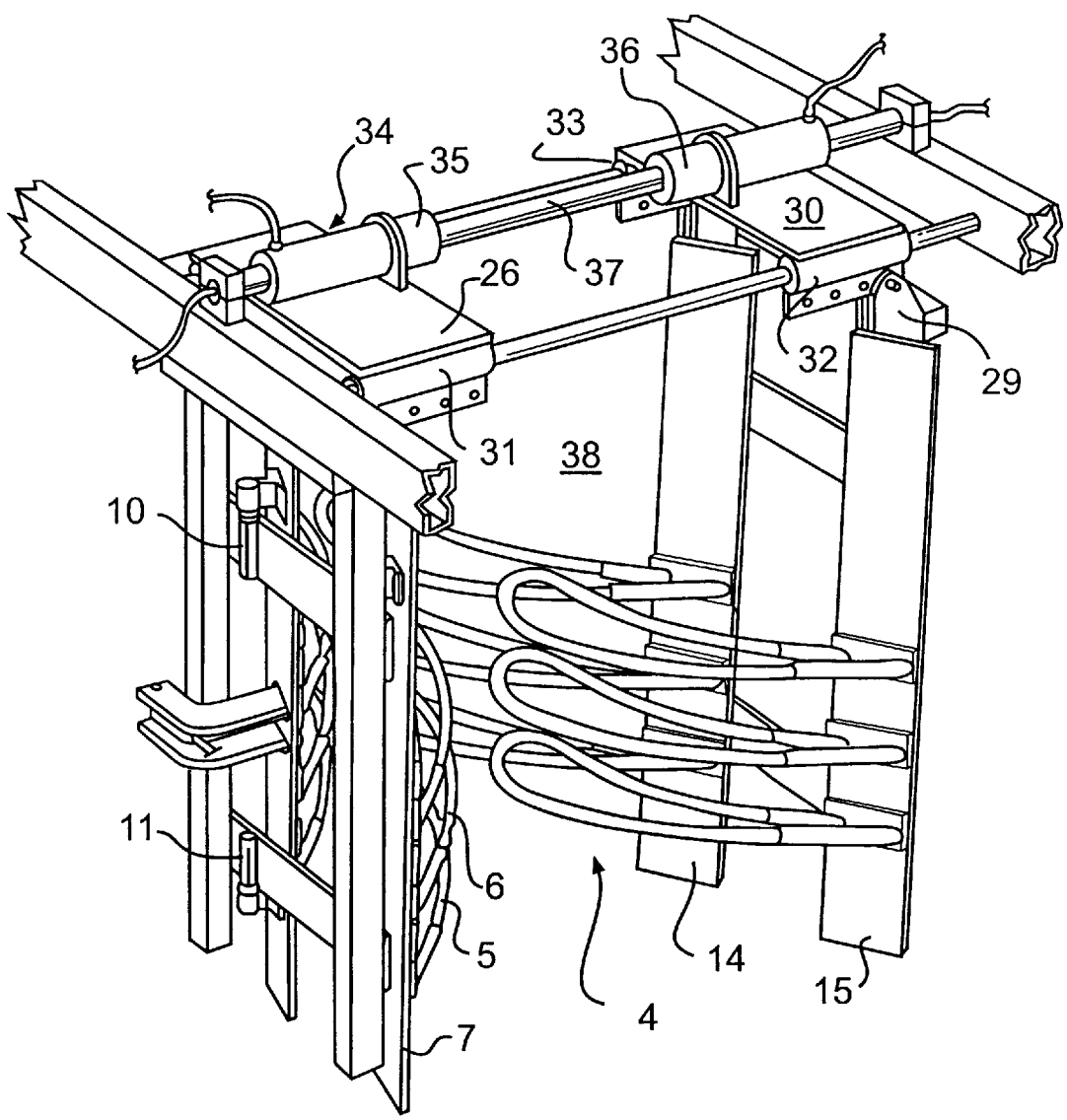
FIG. 3 is a further perspective of some of the elements as shown in the embodiment as in FIG. 1 in this case this being an overhead view of the beaters being supported by their respective sub frames and the support for these.
Figure 4:
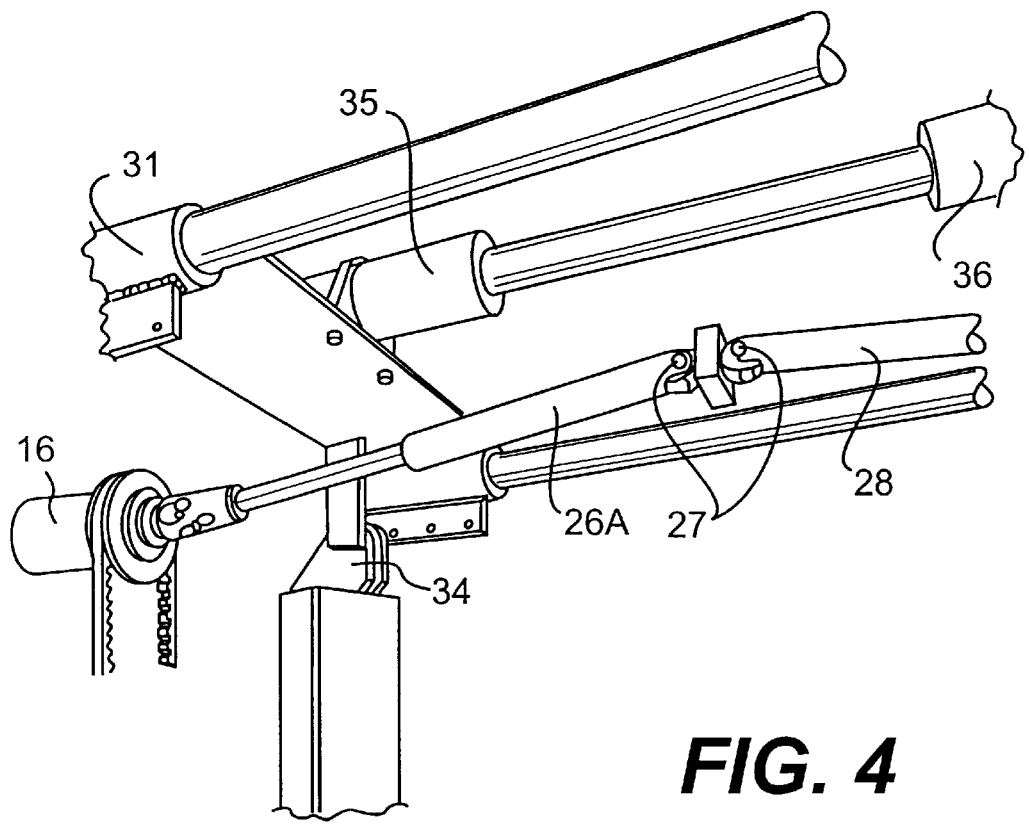
FIG. 4 is a view from beneath the machine showing the elements of the beater drive shaft and connections thereto, and some of the overhead hydraulic ram support system.

Referring in detail to these drawings, the grape harvester 1 includes appropriate ground engaging wheels such as 2 and 3 and a frame 4 which is intended to be used to straddle vines and by reason of sets of beaters shown in FIG. 3 at 4 and 5 effect by reason of unison driving of these, rapid movement of the vines between them so as to effect removal of grapes by this rapid acceleration movement given to the vines.

There are appropriate collection means and storage means associated with the harvester which are not shown in that they are known and they are not directly relevant to the invention.

Each set of beaters and we will take one of these at 5 comprises individual beaters of fibre glass shown at 6 the two ends of the beaters being joined together to form a long loop.

The base of each of the loops is supported by a support plate 7 which in turn is driven with rapid oscillatory motion about its pivot support shown at 8 and 9 in the one case and 10 and 11 in the other by arms 12 and 13. We are describing the support on one side but there are, in respect of the other side, beaters such as the set at 4 an equivalent system and here the respective sets are supported by their respective support plates 14 and 15.

This beating motion is effected through motor 16 which drives in the one case the beater set 6 by driving through toothed belt 17 shaft 18 which carries with it flywheel 19 and two eccentric roller bearing systems at 20 which operate synchronously rods 21 and 22 in unison.

This whole assembly is supported by sub frame 23 which is supported by pivotal connections 24 and 25 from a support frame 26.

Figure 1:
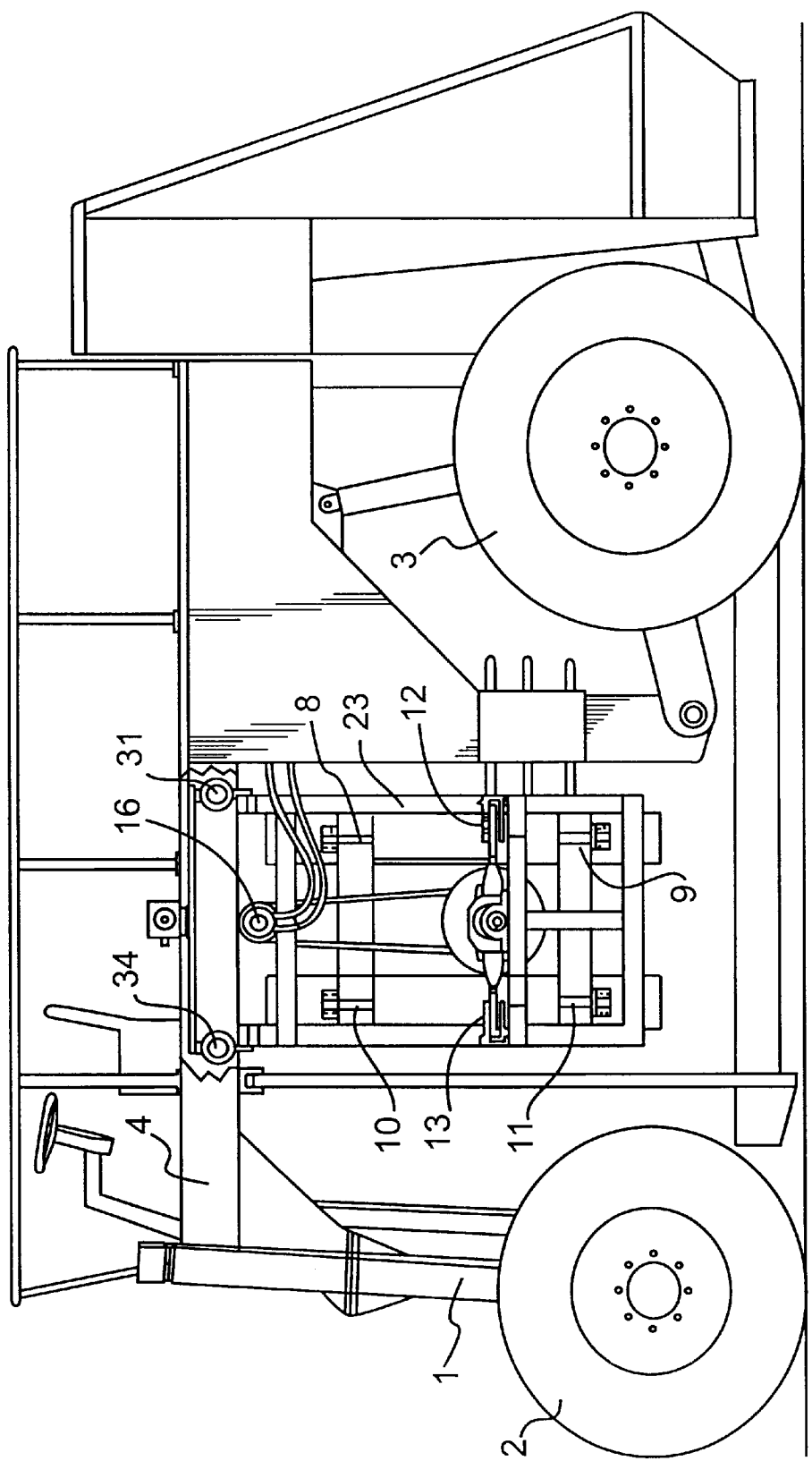
FIG. 1 is a side elevation of a grape harvester according to the embodiment with however some of the pieces removed to allow for a better appreciation of the features of the invention.
Figure 2:
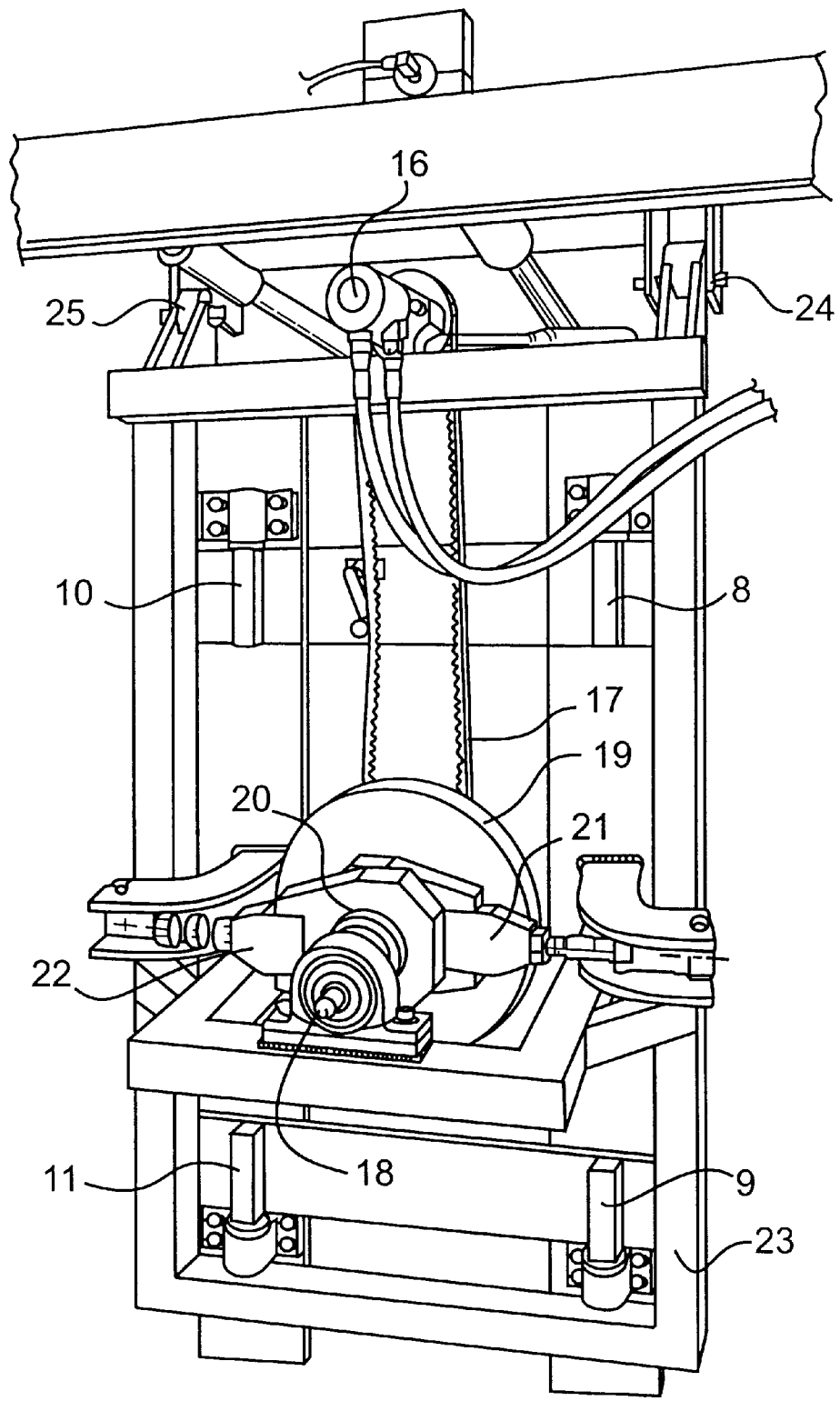
FIG. 2 is a perspective view of a sub frame with flywheel and some of the hydraulic support system this being a part of the embodiment as shown in FIG. 1.

To effect synchronous action with the set of beaters at 4, the motor 16 is connected through a series of extendible shafts shown at 26A, universal connections at 27, further extendible shafts at 28 to connect with a further toothed belt which is not shown which in turn drives an identical system to that shown in FIG. 2 on the other side that is which includes a flywheel, eccentrics and so on.

The sub frame in the other case likewise is supported in the same way and in each case, the shaft supporting the flywheel and therefore the flywheel has a central axis the orientation of which is first of all that it is transversely orientated to a forward to aft direction that is it is substantially at right angles to the forward direction of the vehicle 1, and secondly it is approximately horizontal.

The extent of horizontality depends of course upon the relative position of the sub frame in the case of the one side at 23 and the other which is not shown, but is more or less within 5 to 10 degrees from time to time of horizontality or at least when the orientation on which it is being supported is horizontal when it is being used.

It has been discovered and understood that the orientation of the shaft and therefore the spinning flywheel if it is moved inward or outwardly by swinging appropriate pivot supports at 24 and 25, tend to be taken up by the appropriate forces within the frame and the effect is not to directly interfere with the continuity of the beating action.

This further has the advantage that the forces to support the respective sub frames can be reasonably considered in terms of reasonable hydraulic rams in the application.

The way in which the respective sub frames are supported that is the sub frames 23 and 29 are that these work by being supported by supports at 26 and 30 which in turn are supported at their respective ends by slides shown at 31 and 32 on the one side and 33 and 34 on the other.

Figure 5:
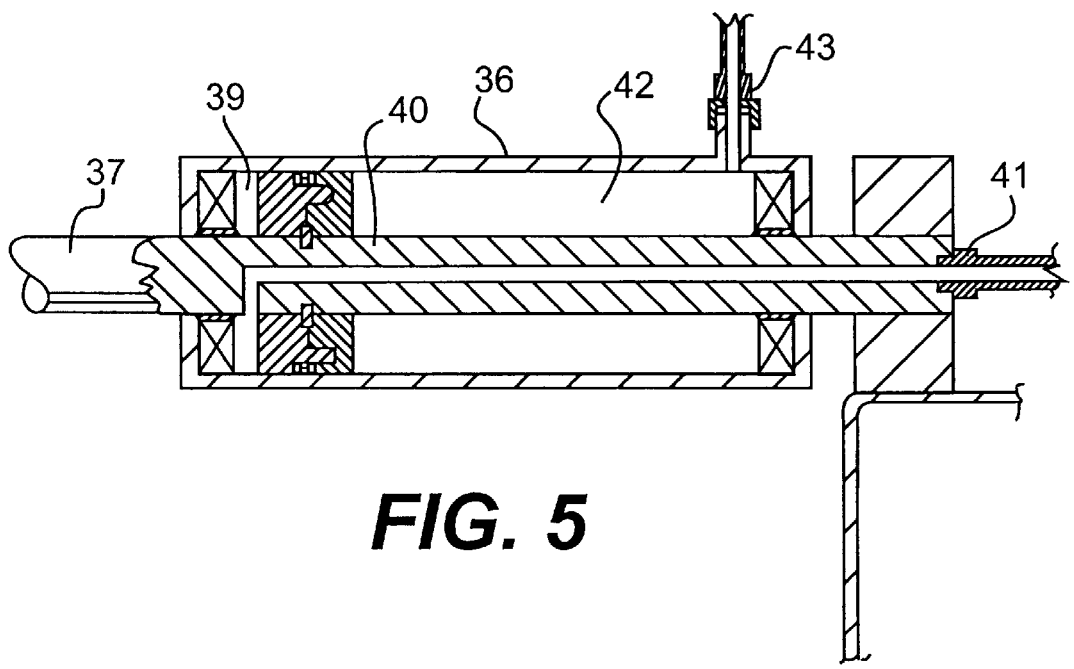
FIG. 5 is a cross sectional view through one of the hydraulic rams again as is used in the embodiment as shown in FIG. 1.

The relative position of these however is governed by the hydraulic rams 35 and 36 which are unusual in that they comprise a cylinder in each case surrounding a common shaft at 37. A further feature of these rams which is explained in FIG. 5 is that they do not have any fittings directly over a grape collection area which might generally be shown at 38 so that the possibility of even accidental drips of hydraulic fluid will be reduced.

To achieve this, there is provided for the outer end of the hydraulic ram at 39 a hydraulic fluid access conduit at 40 which is drilled fully through the shaft 37 and is therefore connected to this only at the outer end at 41.

This problem is not so critical at the outer end for the other end of each of the rams so that at 42, the fitting at 43 is a conventional fitting The results of the features described is that the distance apart of the sub frames 23 and 29 can now be changed while the harvester is harvesting grapes which is to say that the harvester can now have this adjustment made on the run.

This provides significant advantage to operators in that they can now test various settings while the harvester is operating to get the maximum effective location and degree of pressure applicable from the beater sets and therefore optimise the harvesting effect.

As was previously stated, the use of the flywheels in the position shown has assisted in making this a better system.

One further advantage achieved from the arrangement described is that the pressures that can now be detected in the hydraulic fluid of the hydraulic rams can now be used to sense the degree of pressure being applied by the beaters and there can be provided automatic control of these or an automated change process so that an optimum position can be gained automatically.

The invention has been described with one form of harvester and has been referred to as a grape harvester.

The principles are applicable to any harvesting using this general concept and harvesting of sultanas or any other fruit with a similar system can of course be incorporated within this invention.

Further, the invention is directed to the method of harvesting of grapes using a machine of the type being described wherein sets of beaters on each side of the harvester are adapted to be used in unison to effect a beating action, where there are means to change the relative position of the beaters from being a first distance apart to a second distance apart while the beaters are in a beating mode and operating.

What is claimed is:

1. A grape harvester comprising a frame to straddle a vine and means to move the harvester along the vine while straddling the vine, a first set of beaters extending inwardly and rearwardly from a first side of the frame and a second set of beaters extending inwardly and rearwardly from an opposite side of the frame, means to effect synchronous to and fro action of both sets of beaters to effect thereby movement of the vine to effect removal of grapes therefrom, wherein the first set of beaters is supported from a first sub frame which is supported from an upper pivot on a first support and the second set of beaters is supported by a second sub frame which second sub frame is supported from an upper pivot on a second support, and hydraulic means connected to the frame for moving said first and second supports closer together or further apart, wherein the hydraulic means comprises a single shaft and two hydraulic cylinders each surrounding a selected length of the shaft, each cylinder being connected to one of said supports so that the action of hydraulic fluid on a cylinder chances the position of that cylinder and the support to which it is connected along the length of the shaft.

2. A grape harvester as in claim 1, wherein hydraulic fluid connections to the cylinders for access of hydraulic fluid are by way of connections only at a respective outer end of the cylinder so that a location of any connection is not thereby immediately above a grape collection area.

3. A grape harvester as in claim 1, wherein the beater sets are connected to be driven through, for each side, a flywheel with the flywheel supported by the respective sub frame for rotation of the flywheel about its central axis which axis is orientated to be transverse to a forward or rearward direction of the harvester and approximately horizontal when the harvester is being used on level ground.

4. A grape harvester as in claim 1, wherein each set of beaters comprises a plurality of beaters, each beater comprising a loop with respective ends thereof joined together.

5. A grape harvester as in claim 4, wherein a base of each of the loops is supported by a support plate which in turn is adapted to be driven with rapid oscillatory motion about a pivot support connected to a respective sub frame.

6. A grape harvester as in claim 3, including a motor for driving the flywheel by means of a toothed belt.

7. A grape harvester as in claim 6, wherein the central axis of the flywheel includes two eccentric roller bearing systems which operate synchronously via rods which are supported by a respective sub frame.

8. A grape harvester as in claim 3, wherein an extent of horizontality when the harvester is supported on a level surface is within 10 degrees of horizontal.

9. A grape harvester as in claim 1, including means for detecting changes in the pressure of the hydraulic fluid of the hydraulic cylinders for sensing an extent of pressure being applied by the beaters and means for activating the hydraulic cylinders to bring the first and second supports for the sets of beaters closer together or further apart in response to said detected pressure.

* * * * *